United States Patent
Huang et al.

(10) Patent No.: US 6,614,613 B1
(45) Date of Patent: Sep. 2, 2003

(54) PHASE TECHNIQUE FOR ACTIVE DAMPING IN A SERVO-CONTROLLED ACTUATOR

(75) Inventors: Fu-Ying Huang, San Jose, CA (US); Naoyuki Kagami, Fujisawa (JP); Tetsuo Semba, Zama (JP); Eiji Soga, Yamato (JP); Shingo Tsuda, Eda-Machi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/526,261

(22) Filed: Mar. 16, 2000

(51) Int. Cl.[7] ................................ G11B 21/10; G11B 5/596
(52) U.S. Cl. ...................... 360/75; 360/77.03; 318/610; 318/615
(58) Field of Search ................................ 360/75, 77.03, 360/78.11; 318/561, 610, 615, 621

(56) References Cited

U.S. PATENT DOCUMENTS

| | | | | |
|---|---|---|---|---|
| 4,967,293 A | * | 10/1990 | Aruga et al. | 360/75 X |
| 5,426,545 A | * | 6/1995 | Sidman et al. | 360/75 X |
| 5,459,383 A | | 10/1995 | Sidman | 318/611 |
| 5,880,953 A | * | 3/1999 | Takeuchi et al. | 360/78.09 X |
| 6,064,540 A | * | 5/2000 | Huang et al. | 360/75 |
| 6,310,746 B1 | * | 10/2001 | Hawwa et al. | 360/97.01 |
| 6,496,323 B1 | * | 12/2002 | Umeda et al. | 360/78.09 |

OTHER PUBLICATIONS

Kobayashi, M. et al., *MR–46 Carriage acceleration feedback multi–sensing controller for sector servo systems*, Interntl. Conf. on Micromechanics for Info. and Precision Equip., Tokyo, pp. 475–480, Jul. 20–23, 1997.

* cited by examiner

*Primary Examiner*—David Hudspeth
*Assistant Examiner*—James L Habermehl
(74) *Attorney, Agent, or Firm*—Lumen Intellectual Property Services, Inc.

(57) ABSTRACT

An active control mechanism and method for stabilizing a servo-controlled actuator system such as an actuator system in a data recording disk drive by compensating the vibrational modes of the actuator's arm assembly. The control mechanism has a sensing arrangement which can include one or more individual sensors attached to the actuator at locations where they generate signals in phase with the vibrational modes, and especially with all the low-frequency major vibrational modes, of the arm assembly. A control mechanism derives from the signals an adjustment signal consisting of three corrective terms—a stiffening correction, an active damping correction, and an inertia correction by a phase correction. Furthermore, high-frequency out-of-phase modes can be stabilized by appropriately shifting the phase of the signals. The adjustment signal is used in the feedback control loop to stabilize the actuator system.

26 Claims, 11 Drawing Sheets

|  | mode i | mode j | mode k | ... |
|---|---|---|---|---|
| sign of $\Delta_{\text{in-plane}}$ | + | - | + | ... |
| sign of $\varepsilon_i$ for sensor location A | + | - | + | ... |
| sign of $\varepsilon_i$ for sensor location B | - | + | + | ... |
| sign of $\varepsilon_i$ for sensor location C | + | - | - | ... |

PHASE TECHNIQUE FOR ACTIVE DAMPING IN A SERVO-CONTROLLED ACTUATOR

FIELD OF THE INVENTION

This invention relates to an apparatus for and a method of active control for stabilizing multiple vibrational modes of an actuator system.

BACKGROUND OF THE INVENTION

Servo-controlled actuator systems experience serious problems due to mechanical actuator resonances. These vibrational modes include the natural modes of the actuator and those of any intervening mechanical components. With increasing mechanical complexity, the vibrational modes of any given actuator system become difficult to predict. The problem is further compounded as the operating frequency of the actuator system is increased. The vibrational modes limit the control loop gain of the servo system, reduce bandwidth of the servo system, or both. This causes the controlled element, such as a transducer head, to experience excessive settling time after positioning, poor response to disturbances, poor tracking ability, or any combination of these.

Prior art systems have attempted to ensure stable operation of actuator systems by stabilizing the control loop. This has been done by inserting gain stabilizing filters such as electronic notch filters in the control loop path. These filters are placed in the downstream portion of the control loop to filter out the signal information within the band reject frequency range of the notch and thus help minimize excitation of these actuator vibrational modes.

The technique utilizing notch filters allows the servo control system to effectively ignore lightly damped structural actuator resonances. At the resonances very little control is applied by the servo controller.

The drawback to this technique is that it depends on the ability of the designer to accurately predict the frequency of the vibrational modes. This becomes increasingly difficult in high accuracy regimes because the servo system is exposed to many unforeseen disturbances that excite unanticipated vibrational modes. For example, in a hard drive actuator such disturbances include servo amplifier saturation and distortion, external forces on the arm assembly, e.g., due to seek activity, air turbulence, stiction and the like. Such disturbances are typically generated at points in the control path where correction is impossible when gain stabilizing filters are present in the control loop. Consequently, although notch filters are useful in reducing predicted resonances of the servo control system, they do not inhibit the excitation of other vibrational modes by agents external to the servo control loop.

Another technique for damping vibrational modes of a servo control system was presented by Masahito Kobayashi et al. in "MR-46 *Carriage Acceleration Feedback Multi-Sensing Controller for Sector Servo Systems*," at the International Conference on Micromechtronics for Information and Precision Equipment, Tokyo, Jul. 20–23, 1997. This proposed multi-sensing control system uses accelerometers to generate acceleration feedback An acceleration feedback controller receives the feedback signals and compensates the servo to eliminate the mechanical resonance modes.

Although Kobayashi's technique has been demonstrated, it can not be efficiently implemented without the use of notch filters. Furthermore, designing the feedback controller requires the designer to model the very complicated transfer function $H_d(s)$ of the servo-controlled system. This is computationally challenging and requires a considerable amount of processing time. In addition, because the poles and zeros of the compensator used in the feedback controller can not be predetermined, it is not possible to guarantee the existence of a stable compensator.

The prior art also teaches gain stabilization through low-pass filtering in the control loop. In this approach the cutoff frequency of a low-pass filter that is inserted in the control loop is generally lower than the frequencies of any of the lightly damped resonances of the actuator structure. Thus, the components of the control signal having the resonance frequency are effectively prevented from exciting the vibrational modes of the actuator structure. This helps ensure system stability, but it also increases the phase shift at frequencies in the vicinity of the servo loop's unity gain crossing, thereby reducing the bandwidth of the servo system. In fact, this drawback applies to all gain stabilizing filters, including notch filters. The reduction in bandwidth, in turn, reduces the ability of the servo system to correct low frequency vibration and tracking performance such as run out and other disturbances that are due to external excitation and non-linearities in positioning operations.

In U.S. Pat. No. 5,459,383 Sidman et al. teach a feedback loop using a motion sensor located in the servo system at or near the point of control. The sensor is referred to as collocated because it is at or near the point of control. During operation the sensor detects both the rigid body motion and deformation of the actuator. The signal component from the rigid body motion is always much larger than that due to deformation. The collocated feedback loop operates Win conjunction with the ordinary feedback loop and has the effect of making the servo system perform as if the mechanical structure of the system had a much higher mechanical damping than it actually possesses.

Although Sidman's system does improve positioning control and tolerance to internally and externally induced vibrational modes, it still relies on gain filters. Some negative effects of these filters are mitigated by the collocated feedback loop, but the most serious drawbacks, especially the requirement that the engineer know the vibrational modes ahead of time to ensure proper system design, are not obviated. Furthermore, the signal derived from the sensor includes the large rigid body component, which is also processed by the feedback loop and affects the rigid body motion properties of the actuator. This is undesirable since the rigid body properties of the actuator should be preserved.

Thus, the problem of stabilizing servo-controlled actuator systems remains. Solutions using filtering techniques are inadequate in high-accuracy regimes, e.g., in high density hard disk drives, since they require a priori knowledge of the vibrational modes of the system. Meanwhile, solving the transfer function to determine the vibrational modes is computationally unfeasible or impossible in most practical cases.

Finally, prior art systems suffer from the limitation of not being able to actively compensate for multiple vibrational modes at the same time. Specifically, if more than one single mode is selected for active control system stability is, at risk.

OBJECTS AND ADVANTAGES OF THE INVENTION

Accordingly, it is a primary object of the present invention to provide an active control mechanism for stabilizing a servo-controlled actuator system and overcome the disadvantages of the prior art. Specifically, the control mechanism of the invention is designed to circumvent the limitations of the gain filtering approach and provide effective feedback over the actuator's entire range of operation by actively compensating for multiple vibrational modes, thus permitting higher bandwidth operation.

It is another object of the invention to design the control mechanism in such a way that no a priori knowledge of the system's vibrational modes is required for the digital servo controller.

Still another object of the invention is to increase the bandwidth of stable operation of the servo-controlled system and to thus permit one to design, e.g., in the field of hard disk drives, devices with a higher number of tracks per inch (TPI).

Yet another object of the invention is to provide a method for operating the system of the invention to produce an efficient feedback signal. The method limits the computational effort and ensures that the system compensates vibrations quickly and reliably.

Finally, it is an object of the invention to circumvent the necessity of directly solving the transfer function.

The above objects and advantages, as well as numerous improvements attained by the system and method of the invention are pointed out below.

SUMMARY OF THE INVENTION

These objects and advantages are attained by an active control mechanism for stabilizing a servo controlled actuator system having an arm assembly, a controlled element mounted on the arm assembly, an actuator for moving the controlled element by moving the arm assembly and a position sensor, e.g., the controlled element itself, for generating a position signal indicating a displacement of the controlled element. The arm assembly experiences vibrational modes during operation, which are compensated by the active control mechanism.

The control mechanism has a sensing arrangement which can include one or more individual sensors attached to the actuator for generating signals correlated to and in phase with the vibrational modes, and in particular with all the major vibrational modes at low frequencies. A control mechanism is connected to the sensors to derive from their signals, an adjustment signal having three corrective terms a stiffening correction, an active damping correction and an inertia correction. The control mechanism also contains a phase shift circuit to shift the phase of the sensor signals to achieve the three corrective terms and to stabilize out of phase modes at high frequencies. A combining element connected to the control circuit, to the position sensor and to the actuator combines the adjustment signal and the position signal to produce a feedback signal. This feedback signal is used to drive the actuator via a current source, which is connected to the combining element and actuator. Typically, the current source simply delivers a current proportional to the feedback signal to the actuator.

In the preferred embodiment the actuator is a coil, e.g., a VCM coil, and the sensors detect the in-plane sway deformations of the coil produced by the major vibrational modes. Suitable types of sensors for use in the system include strain sensors, strain rate sensors and strain acceleration sensors. The preferred sensor type is a strain rate sensor. In this case the control mechanism induces a 90° phase lag for generating the stiffening, correction, a linear element for generating the active damping correction and mechanism for inducing a 90° phase lead for generating the inertia correction. Alternatively, a phase lag of between 90° and 270° may be used in thins case to stabilize out of phase modes.

The arm assembly typically has a coil support where the coil is mounted and the sway deformations of the coil produce deformations of the coil support which are registered by the sensors. In fact, for best results the sensors are mounted on the coil support.

In some applications, such as hard disk drives, the preferred type of actuator is a rotary actuator. In this case, of course, the controlled element is a read/write head. Other applications require actuators executing other than rotary adjustments, e.g., linear displacements, and employ other types of controlled elements.

Depending on the implementation, the control mechanism may require a low-pass filter for cleaning the signals received from the sensors from unwanted high-frequency noise components. Alternatively, a filter such as a low pass filter, notch filter or low pass filter with zero may be used to implement a phase shift. In addition, an on/off switch or similar circuit can be connected to the control mechanism to halt its operation if needed, e.g., to park the arm assembly on a load/unload ramp.

The method of the invention actively stabilizes the actuator assembly by relying on the signals that are correlated to and in phase with the vibrational modes. In practice, the vibrational modes consist of major modes and minor modes and the sensors have to generate signals correlated to and in phase with the major modes. This is ensured by the proper placement of sensors. The placement can be ascertained by an empirical or computational method. When phase correction is used, the phases of the signals are shifted with respect to modes.

In the empirical method the sensors are removably affixed to the actuator, or the coil support, at a test position. Next, the test position is adjusted until a final position or placement is reached at which the signals delivered by the sensors are in phase with the major vibrational modes. The sensors are then permanently attached at the final position. The computational method involves analyzing the vibrational modes of the actuator and determining the final position based on this analysis.

The first three correction terms are derived from the signals by shifting the phase of the signals. The operations required to derive each correction depend on whether the sensors used measure strain S, strain rate S', or strain acceleration S". In the preferred embodiment the sensors measure the rate of strain S' and the stiffening correction is derived by a phase lag of 90°, the active damping correction is derived by multiplying the signals by a constant, and the inertia correction is obtained by a phase lead of 90°. The phase shifting term is obtained from a phase-shifter circuit.

The particulars of the invention are explained in the description portion in reference to the appended drawing figures.

DETAILED DESCRIPTION

Figure 1:
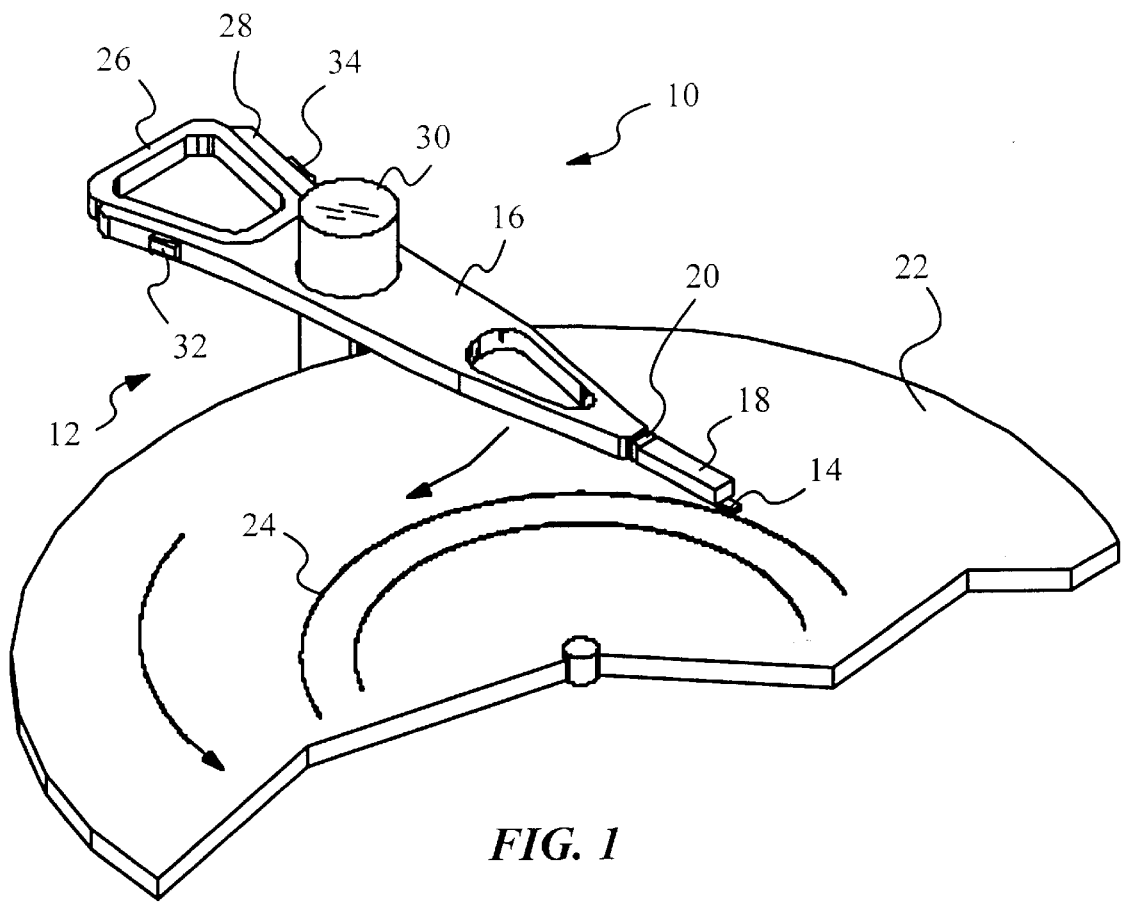
FIG. 1 is an isometric view of an actuator system with an arm assembly according to the invention.

FIG. 1 illustrates a preferred embodiment of a servo-controlled actuator system 10 for a hard disk drive. Actuator system 10 has an arm assembly 12 equipped with a controlled element 14, in this case a read/write head. Arm assembly 12 has a main arm 16 and a secondary arm 18 joined with main arm 16 by a joint 20. Entire assembly 12 is mounted on a hub 30. Head 14 is positioned above a disk 22 with concentric data tracks 24 and accesses various tracks 24 during operation by pivoting or rotating around hub 30. This general construction of arm assembly 12 is well-known in the art of hard disk drives.

An actuator 26, in this instance a coil, e.g. a VCM coil, is mounted in a cradle or coil support 28 opposite head 14. Actuator 26 moves arm assembly 12 by causing it to rotate about hub 30. Consequently, actuator 26 is also known as a rotary actuator. The amount of rotation is controlled by a feedback signal 50 (see FIG. 3) in the form of a current passed through coil 26. Feedback signal 50 is derived according to the method, of the invention as explained below.

Figure 2:
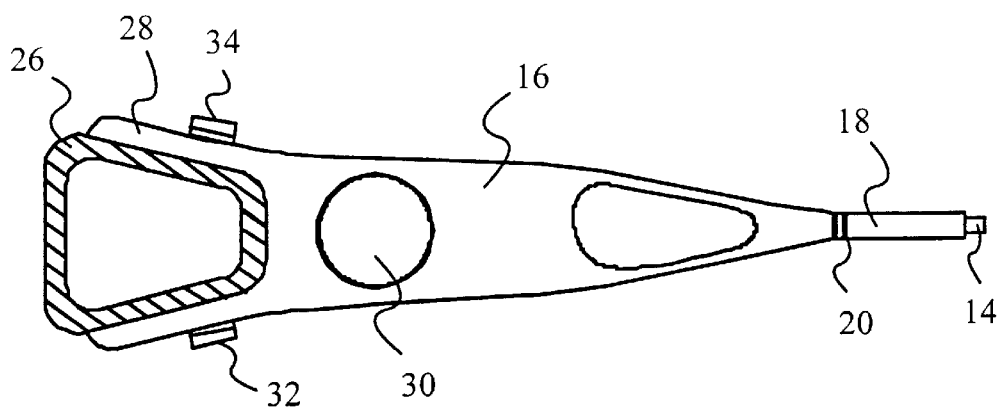
FIG. 2 is a top plan view of the arm assembly of the system of FIG. 1.

As better illustrated in the top plan view of FIG. 2, two sensors 32 and 34 are attached to arm assembly 12 on cradle 28 along two sides of coil 26. In this position, sensors 32, 34 are sensitive to the in-plane sway deformations experienced by coil 26. In other words, when arm assembly 12 experiences vibrational modes during operation, sensors 32, 34 generate signals correlated to these modes. This is because the in-plane sway deformations of coil. 26 translate into deformations of cradle 28.

In most instances an empirical approach is used to obtain a transfer function, H(s), describing the vibrational modes of an arm assembly. For purposes of example, a typical actuator arrangement has several, e.g. ten separate arm assemblies. The most prominent vibrational modes include "butterfly modes" S modes, and end-arm modes. The gain of the "butterfly mode" is often responsible for the limited, operation bandwidth of a typical arm assembly.

To properly compensate these modes, as well as any other modes of arm assembly 12 requiring active compensation, sensors 32, 34 are positioned such that, their signals, are correlated to the modes of arm assembly 12. As is true of any mechanical system, when arm assembly 12 vibrates, the vibration can be decomposed into several vibrational modes which have their own unique vibration shapes called "mode shapes". The mode shape $\overline{\phi}_i$ of the i-th mode can be expressed as:

$$\overline{\phi}_i = \overline{\phi}_i(x,y,z)$$

which is a function of location (x,y,z). The net in-plane sway deformation $\Delta_{in-plane}$ of coil 26 is then described by:

$$\Delta_{in-plane} = \int_{coil} \overline{\phi}_i(x, y, z) \cdot \overline{F}(x, y, z) \, dx \, dy \, dz,$$

where $\overline{F}$ is the force applied on coil 26. Thus, the strain, $\epsilon_i$, experienced by sensor 32 due to the i-th vibrational mode is also a function of the mode shape $\overline{\phi}_i$ and is represented by:

$$\epsilon_i = \epsilon_i(\overline{\phi}_i).$$

When the sign of <the sway deformation $\Delta_{in-plane}$ is the same as the sign of strain $\epsilon_i$ at the location of sensor 32, then the signal generated by sensor 32 is in phase with the i-th vibrational mode. Sensor 32 is placed at a location where such in-phase correlation exists between its signal and the i-th vibrational mode. Since two sensors 32, 34 are used in this particular embodiment, $\epsilon_i$ is replaced by the sum of the strains multiplied by weighting factor son both sensor locations.

Figures 4, 5:
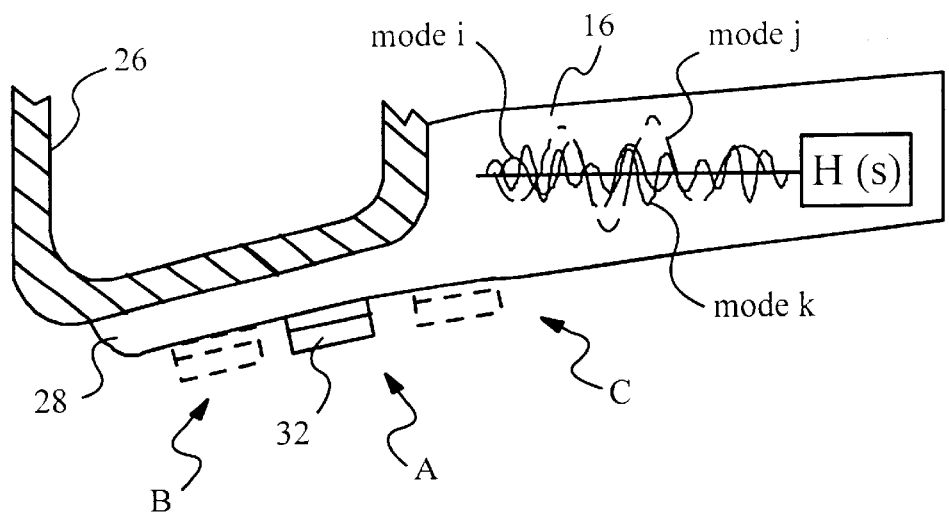
FIG. 4 is a schematic view illustrating the positioning of the sensors on a coil support.
FIG. 5 is a table illustrating the, in-plane relationship between the strain sensor output, and the major vibrational modes with respect to the net in-plane sway deformation.

Proper placement of sensors 32, 34 is visualized in more detail by FIGS. 4 and 5. For the sake of simplicity, FIG. 4 only shows three test positions A, B, and C of sensor 32. The transfer function H(s) consists of a multiplicity of modes of which three are major and have to be actively compensated: mode i, mode j and mode k. These may correspond to the first butterfly mode and the first and second end arm modes and directly limit servo performance and bandwidth because of their high gains and/or light damping. The remaining modes are minor modes, which have low gain and are heavily damped and negligible modes, which have very low gain and frequently lie outside the range, of interest.

In each position, sensor 32 effectively partitions all vibrational modes into two groups; one group of modes is in phase with the signal of sensor 32 and the other is out of phase. The final position of sensor 32 has to be such that all major low-frequency modes i, j and k are in phase with its signal. The phase relationship with minor and negligible modes is not important and these may all fall into the out of phase partition. In fact, minor modes generally remain stable due to original material damping and high-frequency out-of-phase modes may be stabilized by the phase shift technique.

The table in FIG. 5 shows the phase relationship between output signal of sensor 32 and major modes i, j, and k with respect to sway deformation $\Delta_{in-plane}$. At location A the signal of sensor 32 is in phase with modes i, j, and k. At location B the signal of sensor 32 is out of phase with modes i and j, and at location C it is out of phase with mode k. Hence, the proper final location for permanently mounting sensor 32 is A.

In practice, the proper final positions for sensors 32 and 34 can be found by enipirical or analytic methods such as computer-implemented algorithms. When the mechanical structure of arm assembly 12 is specially designed, e.g., when arm assembly 12 belongs to a rotary actuator system used in hard disk drives, the general vicinity of the potential final position is easier to predict and hence the empirical approach is viable.

The analytical approach involves modeling arm assembly 12. This is done, for example, with the aid of finite element analysis software. The analysis pinpoints final position A on arm assembly 12, specifically on cradle 28, where sensor signals are in phase with the low-frequency major modes. These positions are the set of final positions at which sensors 32 and 34 are permanently attached.

Figure 3:
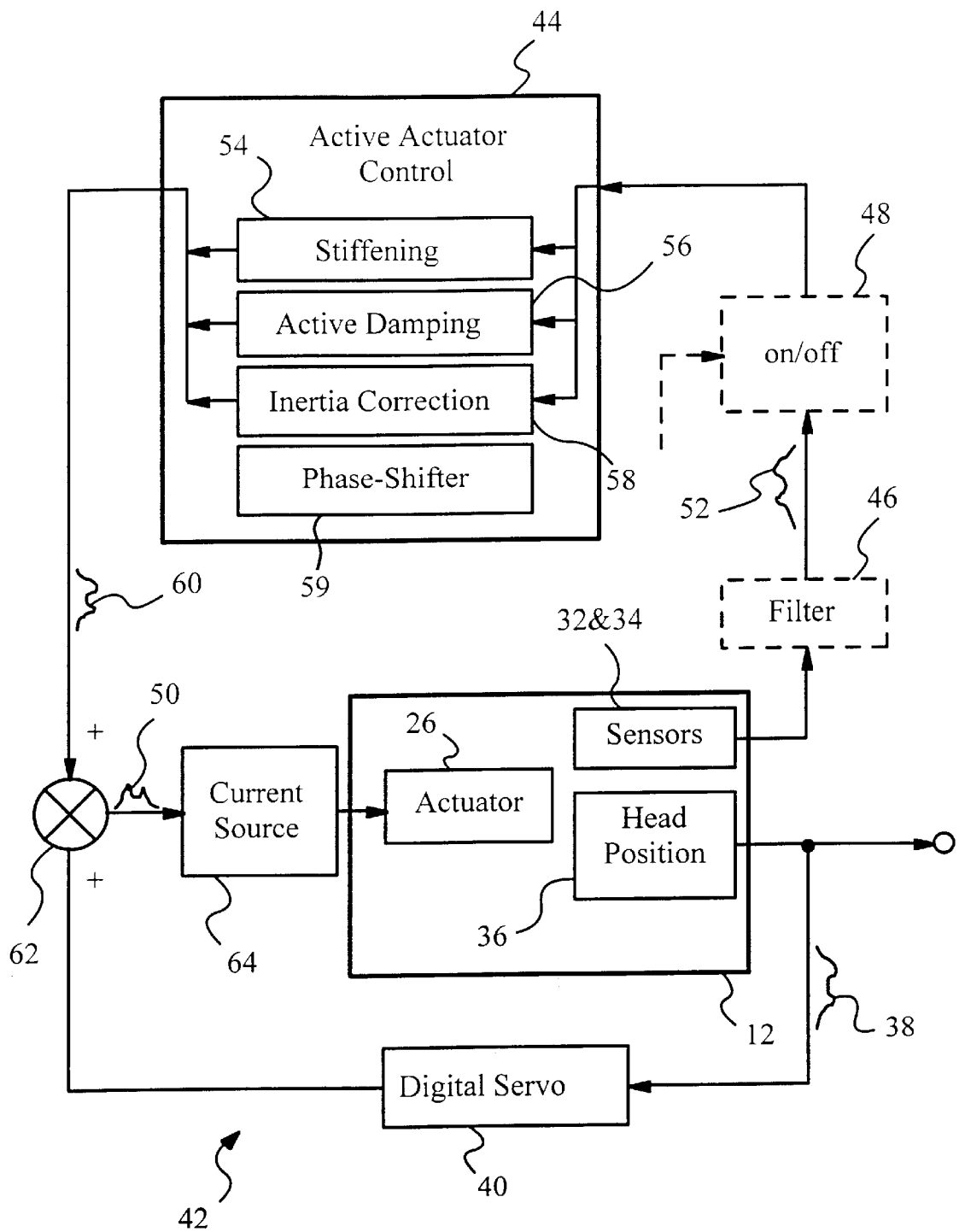
FIG. 3 is a block diagram of the active control system according to the invention.

The block diagram of FIG. 3 shows the vital parts of system 10 and explains their cooperation. In addition to the above-described elements, system 10 also has a position sensor 36, which can be a standard device, mounted either on or off arm assembly 12 for generating a position signal 38 indicating the displacement or the instantaneous position of head 14. In fact, position sensor 36 can simply be head 14 itself and position signal 38 can be derived by head 14 from markings disposed on disk 22 and specifically from position information found in tracks 24. Alternatively, head 14 can use the head position error signal (PES) read from pre-recorded servo information on disk 22, e.g., servo sectors angularly spaced around disk 22, to generate position signal 38.

Position sensor 36 or head 14 is connected to a digital servo 40. Digital servo 40 is a part of a feedback loop 42 for controlling the operation of actuator 26 based on the position of head 14.

Sensors 32, 34 are connected to an active actuator control 44 via an optional filter 46, typically a low-pass filter, and an optional on/off switch 48, both indicated in dashed lines. In the preferred embodiment filter 46 is present and removes high-frequency noise components from signals 52 generated by sensors 32, 34. Interrupt circuit 48 is also present in the preferred embodiment and disables actuator control 44 if needed. This happens, for example, while head 14 is rotated to switch data tracks 24 on disk 22 or before and/or during parking the arm assembly on a load/unload ramp (not shown).

Actuator control 44 has a stiffening part 54, an active damping part 56 and an inertia part 58, which can be achieved by a phase shifter 59. These parts derive from signals 52 a stiffening correction, an active damping correction, and an inertia correction by a phase shift mechanism. Suitable combinations of these three correction terms represent an adjustment signal 60, which is sent to a combiner or adder 62. In fact, adder 62 is connected not only to actuator control 44 but also to digital servo 40. Thus, adder 62 adds position signal 38 as delivered by servo 40 to adjustment signal. 60 to produce feedback signal 50. Preferably, feedback signal 50 is a current and adder 62 is connected directly to a current source 64 which controls the current in coil 26, thus completing feedback loop 42. Of course, amplifiers and filters may be required to process feedback signal 50. The use of these elements in feedback loop 42 is straightforward and their necessity and preferred locations can be easily determined by a person of average skill in the art.

Figure 6:
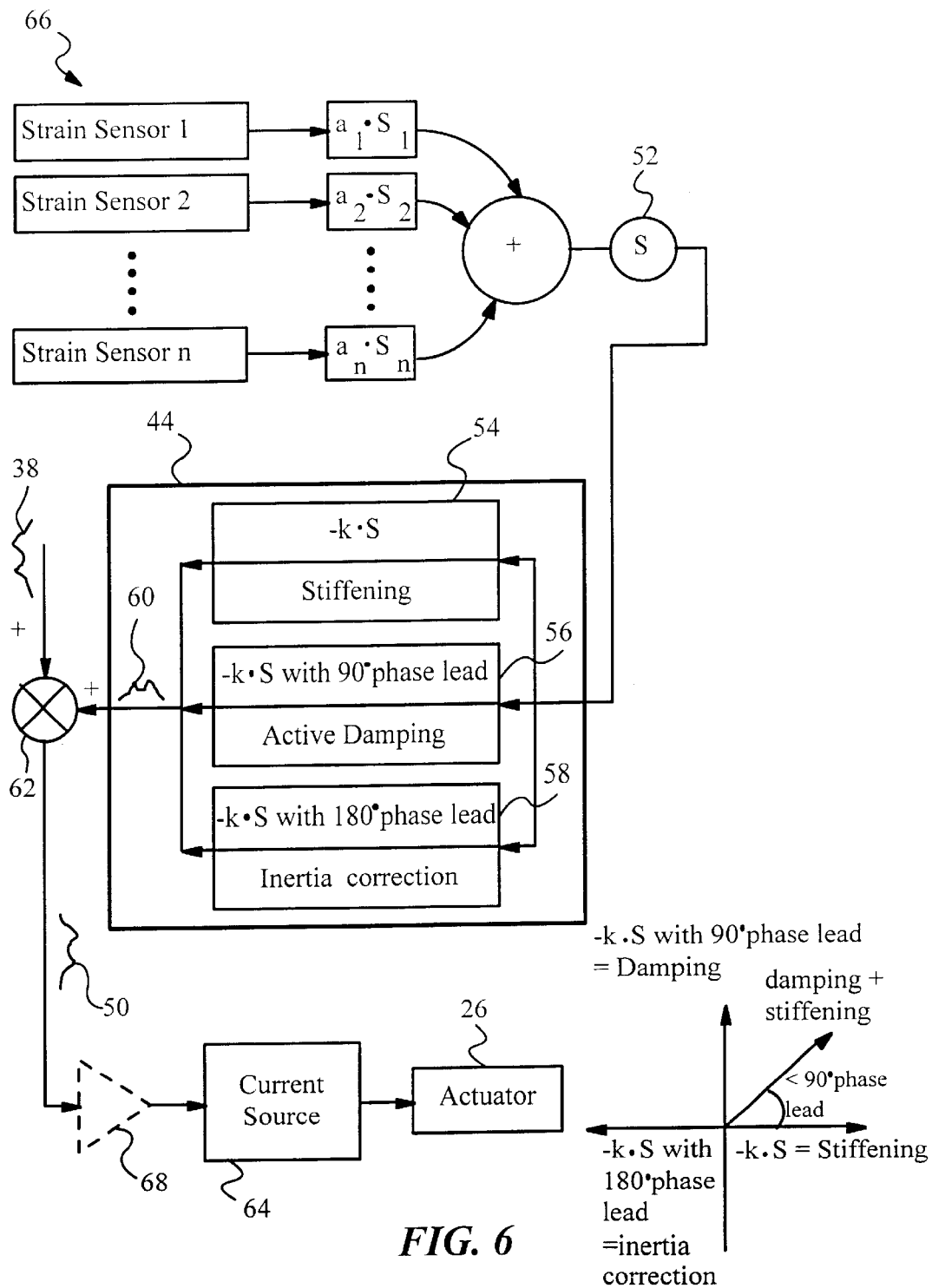
FIG. 6 is a block diagram showing the computation of the adjustment signal when using a strain-sensor.

The details of how the first three correction terms are computed are explained in reference to the generalized diagram of FIG. 6. The computation applies to sensors 32, 34 as well as any number of sensors n. Hence, the diagram shows sensors 32 and 34 replaced by a number n of sensors 66, each delivering a partial signal $a_i S_i$ such that the total signal 52 or S is:

$$S = \sum_{i=1}^{n} a_i S_i$$

where the $a_i$'s are constants or weighting factors. In this embodiment sensors 66 are strain sensors and consequently partial signals $S_i$ are in effect strain signals $\epsilon_i$ weighted by weighting factors $a_i$.

Total strain signal S is delivered to stiffening part 54, active damping part 56 and inertia part 58, alike. Stiffening part 54 is a multiplier or linear element which multiplies strain signal. S by a negative constant −k to produce the stiffening correction. Active damping part 56 a linear element which multiplies S by a negative constant −k and a phase shifting element that induces a 90° phase lead to generate the active damping correction. Finally, inertia correction part 58 has a linear element that multiplies S by a negative constant k and a phase shifting element that induces a 180° phase lead. Therefore, −K·S with a phase lag of less than 90° represents a combination of damping and stiffening as shown in, the phase diagram in the inset of FIG. 6. The linear elements are well-known in the art and the way in which, they have to be used to generate each of the three correction terms is apparent to a person of average skill in the art. Furthermore, when phase shifting is employed to generate the correction terms, the locations of the sensors one the actuator assembly is less critical than in previous techniques.

By suitable combination of the three correction terms any desired phase shift may be produced. The correction terms are combined to yield adjustment signal 60, which is sent to adder 62. In adder 62 adjustment signal 60 may be combined with position signal 38 to produce feedback signal 50 and the latter is sent to current source 64. An optional amplifier 68 for amplifying feedback signal 50 is connected before current source 64.

Figure 7:
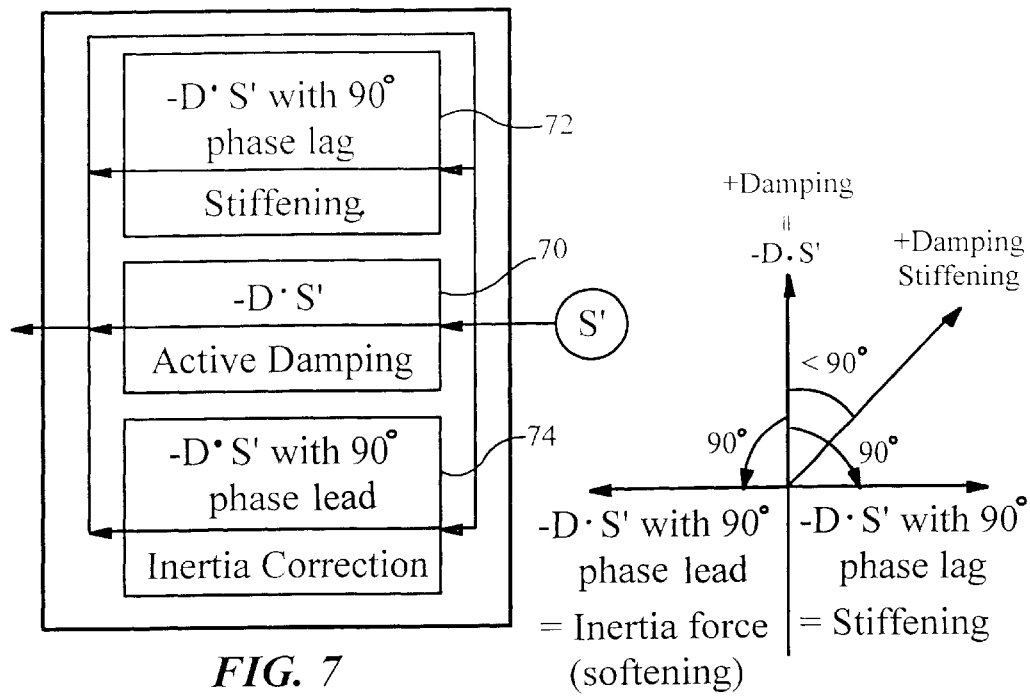
FIG. 7 is a block diagram showing the computation of the adjustment signal when using a strain rate, sensor.
Figure 8:
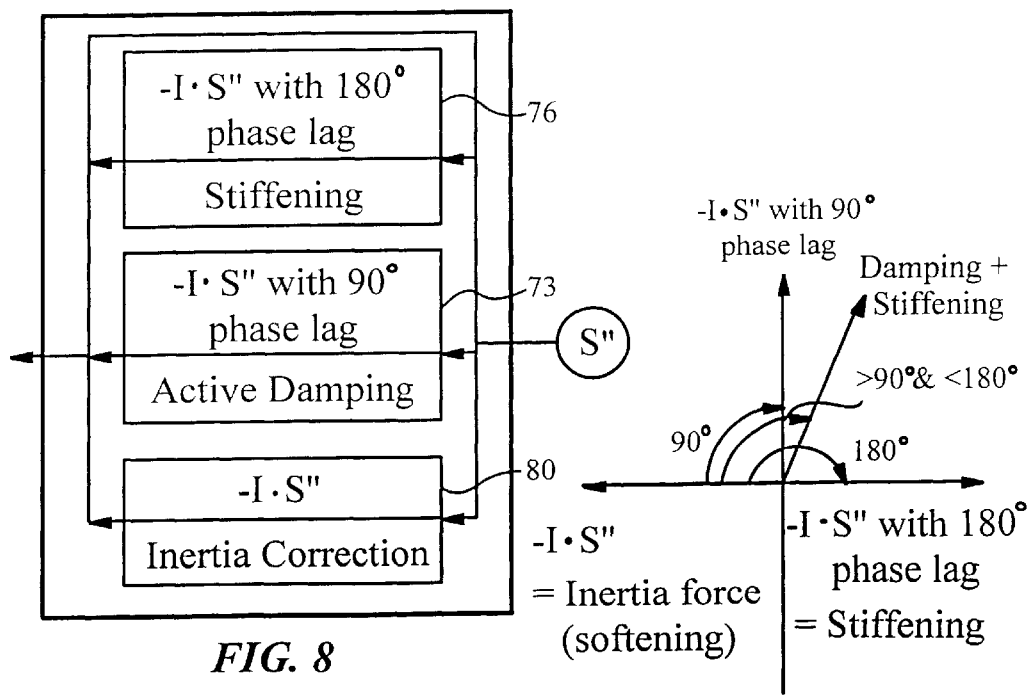
FIG. 8 is a block diagram showing the computation of the adjustment signal when using a strain acceleration sensor.

Sensors 66 can be replaced by strain rate or strain acceleration sensors. Furthermore, strain, strain rate and rate of strain rate can be derived from one another by differentiation and integration. In fact, the use of sensors registering strain rate S' is preferred because they reduce the computational or hardware requirements on actuator control 44. This is shown in FIG. 7, where signal 52 is a strain rate signal S'. Now, a stiffening part 70 is a linear element with multiplier equal to −D and a phase shifter that induces a phase lag of 90°. An active damping part 72 is replaced by a linear element with multiplier equal to −D. An inertia correction part 74 is a linear element with multiplier equal to −D and a phase shifter that induces a phase lead of 90°. Also −D·S' with a phase lead of less than 90° represents a combination of damping and stiffening as shown in the phase diagram in the inset of FIG. 7. The case in which signal 52 represents is train acceleration (i.e., rate of strain rate) S" is shown in FIG. 8. Here a stiffening part 76 is a linear element with multiplier equal to −I and a phase shifter that induces a phase lag of 180°. An active damping part 78 is a linear element with multiplier equal to −I and a phase shifter that induces a phase lag of 90°. An inertia correction part 80 is a linear element with multiplier equal to −I. Furthermore, −I·SS" with a phase lead of 90° to 180° represents a combination of damping and stiffening as shown in the phase diagram of the inset to FIG. 8.

System 10 enjoys stable operation and allows the designer of hard drives to increase the number of tracks per inch (TPI) significantly. Of course, operation stability also translates into improvements in the bandwidth and response characteristics of other actuator systems.

The above embodiments may be, altered in many ways without departing from the scope of the invention. For example, rather than correlating the signals of sensors such that they are in phase with the major low-frequency modes, the signals can be out of phase with all major modes. In such case the signal is simply multiplied by the factor −1 to obtain the proper in phase signal for processing in the feedback loop.

Out of phase modes with high frequency and high gain may be controlled by a phase-shift technique. The phase shift technique may be used alone or in combination with the other techniques described above. In this technique, the adjustment signal comprises a phase Correction. The phase correction shifts the phase of the feedback signal with respect to the signal from the sensors. For the case of strain rate feedback, shifting the phase by 90 to 270 at high, frequencies damps/stabilizes the high frequency out-of-phase modes while simultaneously damping and stiffening the butterfly mode.

Figure 9:
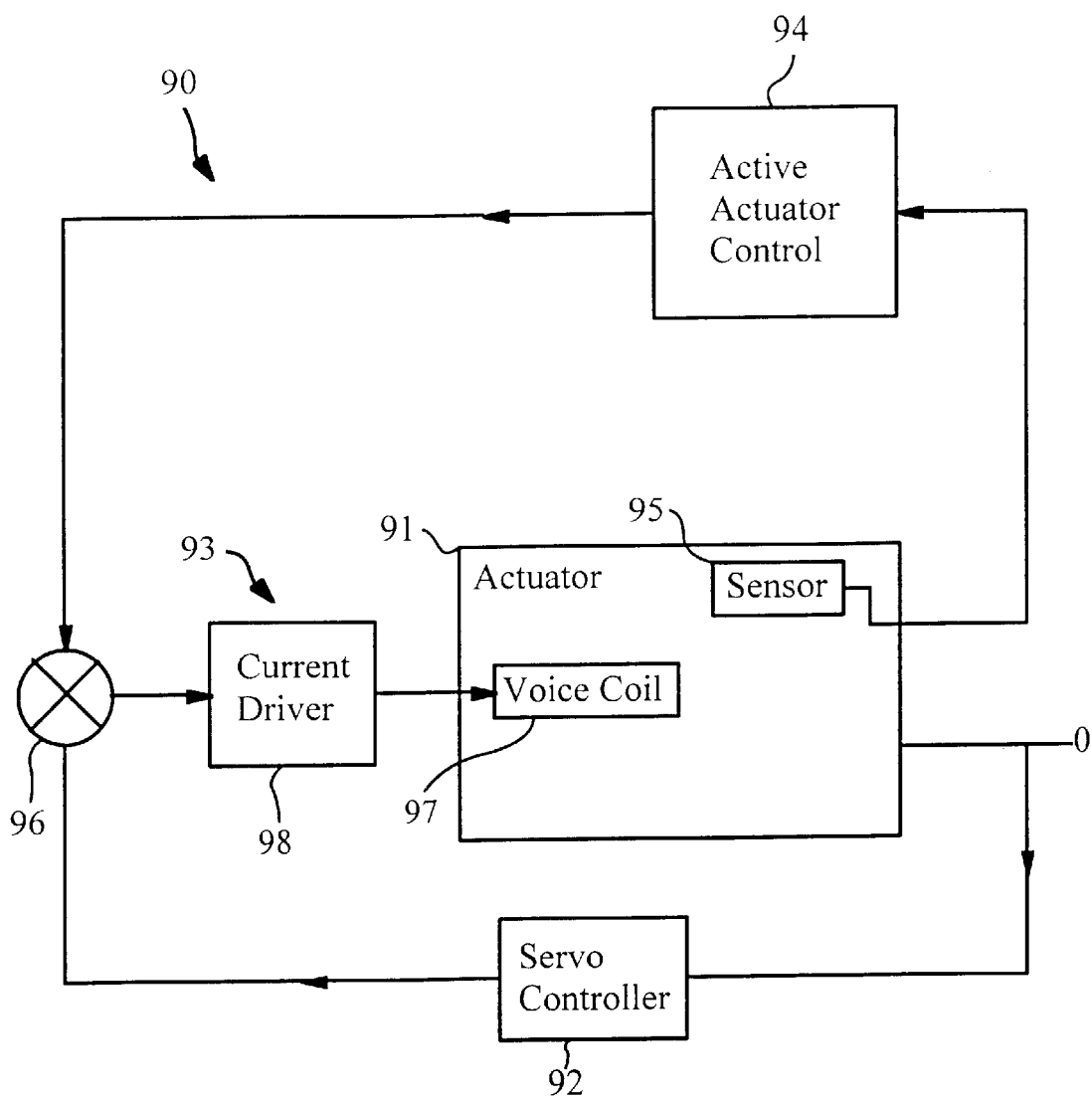
FIG. 9 depicts a block diagram of an actuator control mechanism including a phase shifter.

FIG. 9 depicts a block diagram of an actuator system 90 having an active control mechanism that incorporates a feedback loop of having a phase shifter. The system 90 generally comprises an actuator 91, a servo controller 92, a driver 93, and a phase shifter 94. Actuator 91 may be any type of actuator such as the arm assembly described above with respect to FIG. 1. Actuator 91 is driven by a force provided by driver 93 in response to a drive signal from a servo controller 92. Driver 93 may be any type of device that provides a controllable force such as a voice coil 97 and current driver 98.

A sensor 95 mounted to actuator 91 measures a deformation or motion of actuator 91. Sensor 95 may be a strain sensor, a position sensor, pikeozoelectric transducer (PZT), accelerometer or other suitable sensor. Alternatively, combinations of two or more sensors of any of the above types may be used. Sensor 95 provides a signal to phase shifter 94. Phase shifter 94 induces a phase shift between that shifts a phase of signal from sensor 93 relative to the drive signal to produce a phase corrected adjustment signal. Generally the phase of the feedback signal can either lead or lag the phase of the sensor signal.

A signal combiner 96 combines the phase corrected adjustment signal with a driver signal from servo controller 92 to produce a feedback signal. The feedback signal controls the driving force on actuator 91, e.g., by controlling the current flow from the current driver 98 to voice coil 97.

Figure 10:
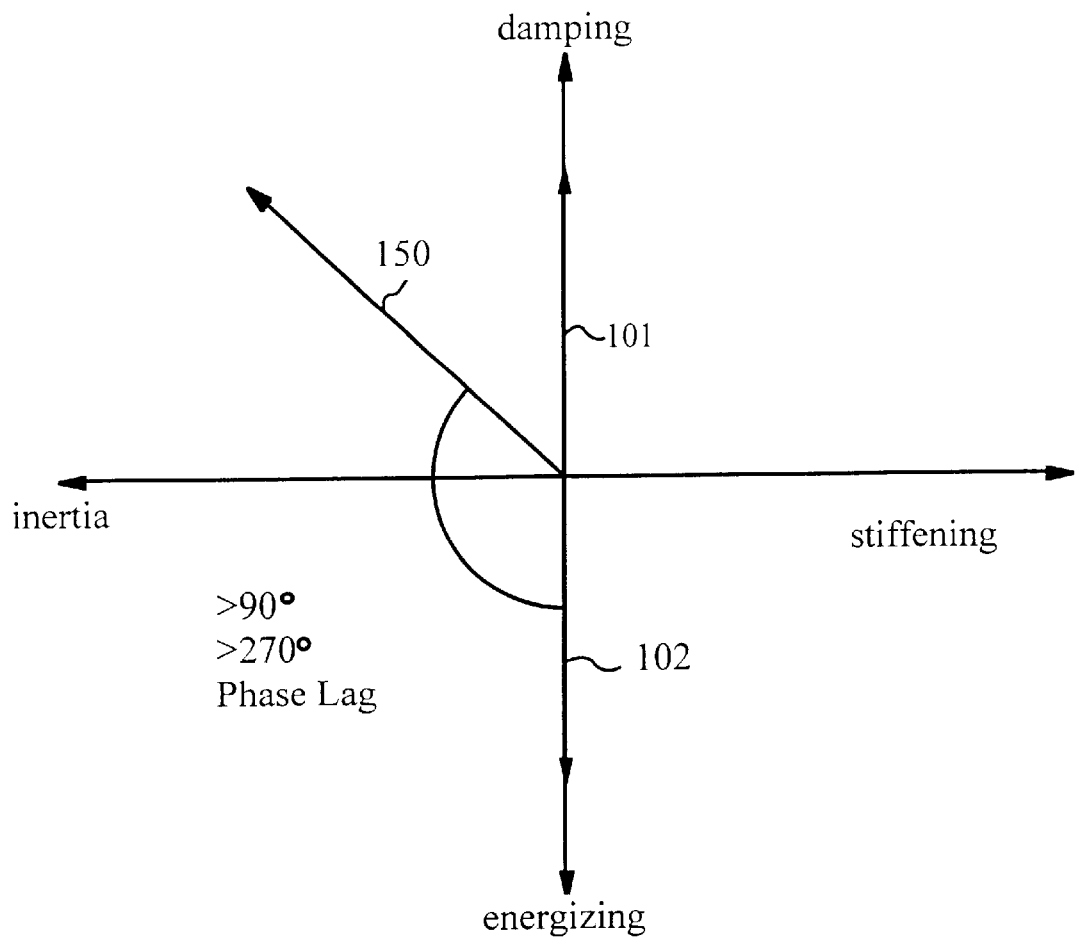
FIG. 10 shows a polar diagram depicting the effect of a phase on a vibrational mode.

The phase plot of FIG. 10 shows the effect of the phase shift of the sensor signal relative to the feedback signal on a vibrational mode. Depending on the amount of phase shift of force vector 100 the mode is either positively or negatively damped. In FIG. 10 a vector 100 having a positive vertical component represents a phase orientation that results in a damping of a vibrational mode of the system. A force vector having negative vertical component indicates that the adjustment signal that introduces this phase will energize the mode rather than dampen it. A positive horizontal vector represents a stiffening of the mode and the negative horizontal vector represents an inertial "softening" of the mode.

For the case of a damping correction using strain rate feedback, or strain feedback with 90° phase lead or rate of strain rate feedback with 90° phase lag, consider in phase modes and out-of-phase modes. The damping correction generates a force vector 101 that is vertical for in phase mode, such that the modes can be damped. However, the damping correction generates a force vector 102 for out-of-phase-modes, such that the modes will be energized. An out-of-phase mode can therefore be stabilized by introducing a phase lag of between about 90° and 270° in the feedback loop. This type of phase shift turns the force vector for the out-of-phase modes into the stable region with a positive damping force component.

Figure 11:
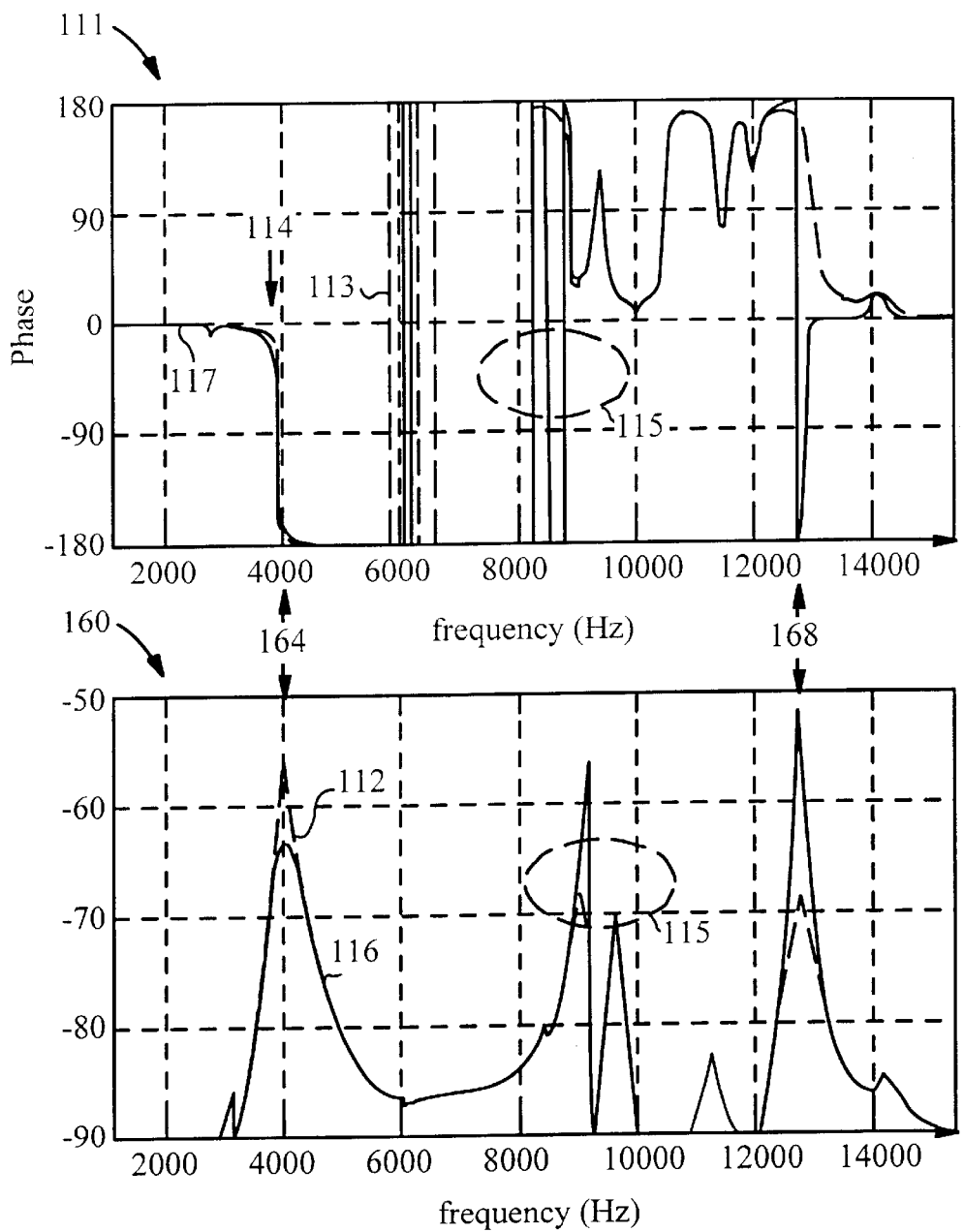
FIG. 11 depicts graphs of signal strength and phase for a PZT sensor on a rotary actuator without phase-shifting.

FIG. 11 depicts graphs of signal strength 110 and phase 111 for a PZT sensor on a rotary actuator. Without active damping, dashed plots 112 and 113 show a butterfly mode 114 at about 4 kHz and some out-of-phase T high gain modes 115 at frequencies above 9 kHz. Solid plots 116 and 117 show that when active damping is applied to the actuator system without a phase shift in the active damping loop butterfly mode 114 is only slightly damped and the out-of-phase modes 115 above 9 kHz are energized. A mode 118 at 13 kHz becomes unstable to the point of destabilizing the entire system.

Figure 12:
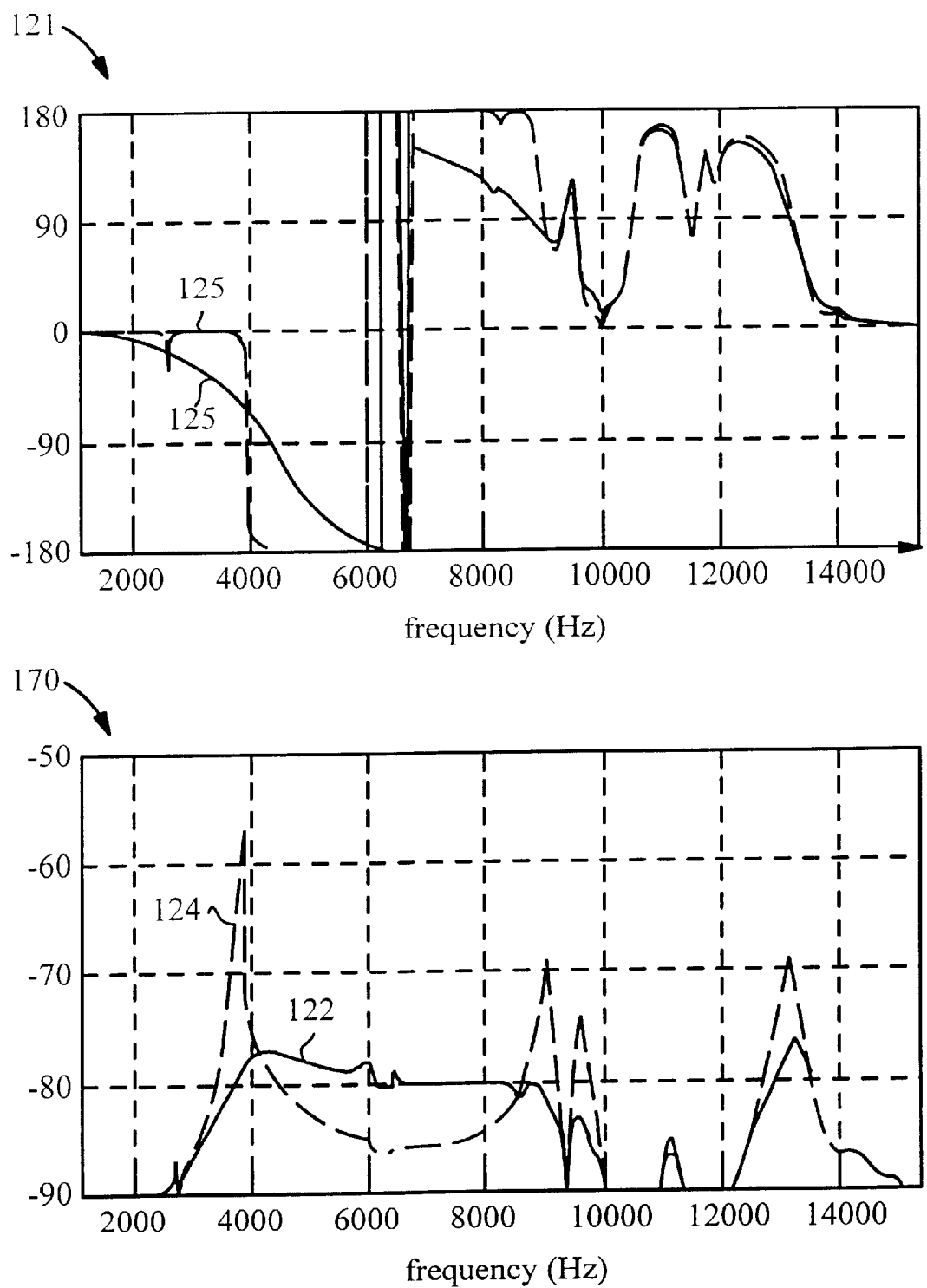
FIG. 12 depicts graphs of signal strength and phase for a PZT sensor on a rotary actuator with a phase shift in the active damping loop.

FIG. 12 shows graphs of signal gain 120 and phase 121 when the active damping loop includes a phase lag of greater than 90°. Solid plots 122 and 123 show that both the butterfly and out-of-phase modes become damped and stable. Dashed plots 124 and 125 taken without active damping and phase shifting are shown for comparison.

Figure 13:
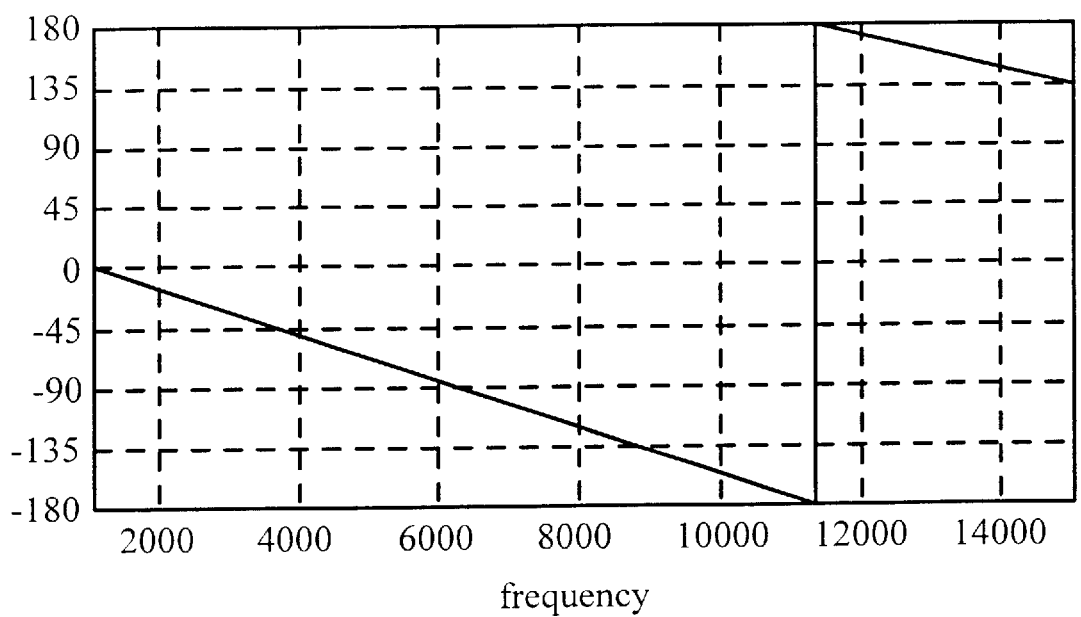
FIG. 13 depicts a graph of a phase shift as a function of frequency for a control mechanism according to an embodiment of the present invention.

To optimize the damping effect, the phase shift of a given mode may be a function of frequency. In general, the phase shift is a function of both the phase shifter circuit and the current driver circuit. FIG. 13 depicts a graph of an exemplary transfer function for a phase shifter and current driver for a disk drive actuator. Note that the phase shift becomes more negative as frequency increases. The apparent discontinuity, at about 11.5 kHz is due to the fact that a phase shift of −180° is equivalent to a phase shift of +180°.

Figure 14:
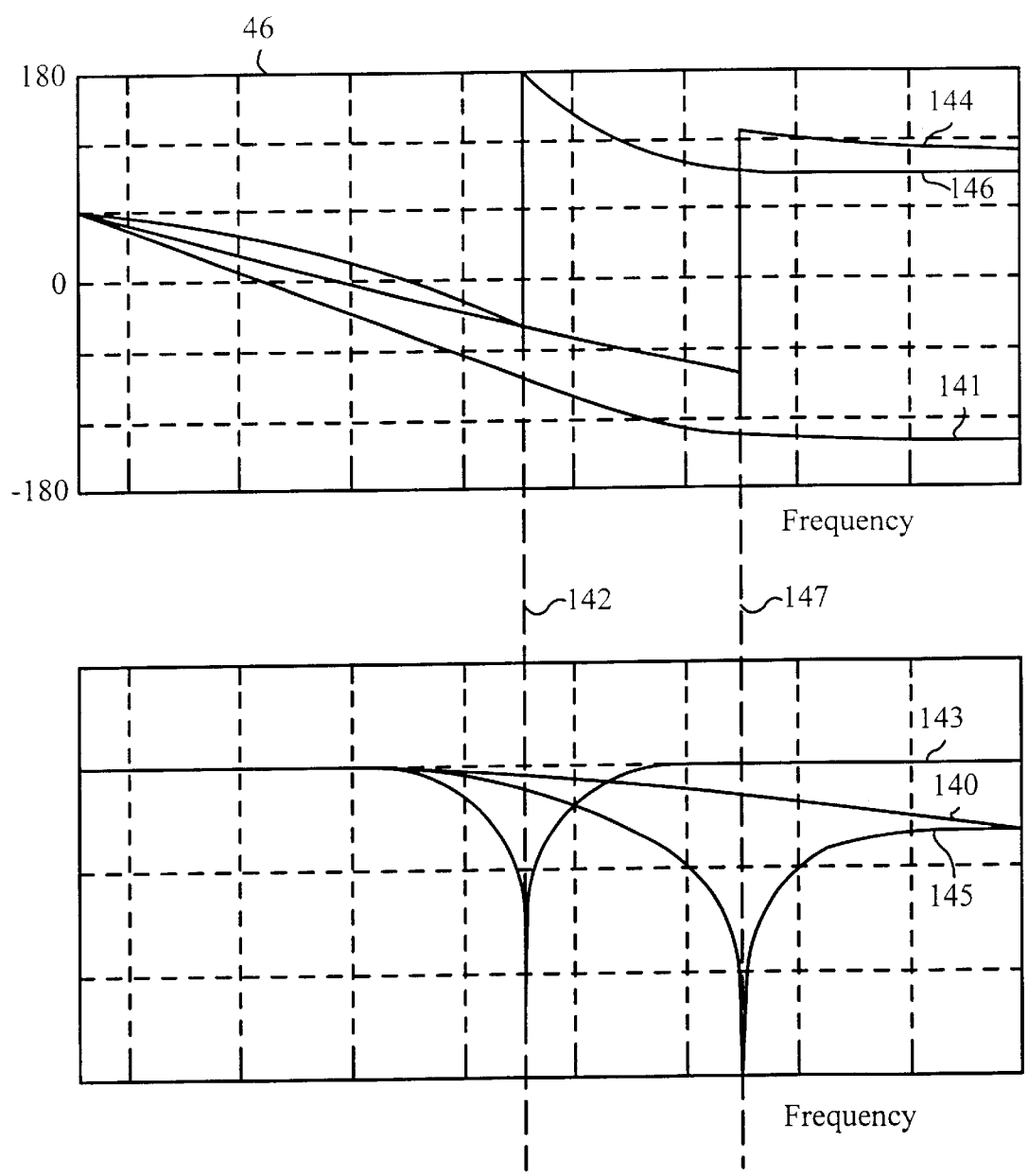
FIG. 14 depicts graphs of gain and phase characteristics for three exemplary types of filters according to embodiments of the present invention.

The phase shifter can be implemented, for example, by adding a phase-shifting filter between the PZT amplifier and the VCM driver. One possible filter that implements a phase shift is a low-pass filter. A low pass filter generally transmits signals having frequencies below a certain cutoff frequency and attenuates or blocks signals having frequencies above the cut-off frequency. Exemplary gain and phase characteristics for a low-pass filter are shown in plots 140 and 141 respectively of FIG. 14. Generally, the phase of a second-order low-pass filter starts from 0° and converges to −180° at high frequency. To stabilize an out-of phase mode, the cutoff frequency is preferably lower than the frequency of the mode so that the phase lag is more than 90° at the mode. However, if the mode is close to the butterfly mode, the phase of the feedback signal at the butterfly mode may also be delayed, which may adversely affect the stability of the butterfly mode.

As an alternative, the phase shifter may include a notch filter. A notch filter sharply attenuates signals within a given frequency band centered on a given frequency 142. Exemplary gain and phase characteristics for a notch filter are shown in plots 143 and 144 respectively of FIG. 14. At low frequency, a notch filter typically has less phase lag than a low-pass filter. Furthermore, a suitably designed notch filter can also suppress the amplitude of an out-of-phase mode at the notch frequency. As such, the overall system stability can be improved without sacrificing the damping gain.

Another alternative filter is a low-pass filter with zero. This type of filter has gain and phase characteristics similar to a combination of a low-pass filter and a notch filter. Exemplary gain and phase characteristics for a low-pass filter with zero are shown in plots 145 and 146 respectively of FIG. 14. Signals within a given frequency band centered on a given frequency 147 are strongly attenuated. The low-pass filter with zero can be configured to reduce the phase lag at the butterfly mode, increase the phase lag of one or more out-of-phase modes, and suppress the gain of additional out-of-phase modes at higher frequencies.

The specific choice of filter is largely dependent on the requirements of the apparatus. For example, if hardware costs and/or complexity are to be minimized, a simple low-pass filter with a cutoff frequency less than that of the butterfly mode can reduce the phase lag at the butterfly mode. If a little more complexity is allowed, those skilled in the art wilt be able to devise other suitable combinations of these techniques that will improve the overall system stability while increasing the damping gain at the butterfly mode.

A person of average skill in the art will be able to make additional modifications based on the above teaching without venturing beyond the scope of the invention. Accordingly, its scope should be determined by the following claims and their legal equivalents.

What is claimed is:

1. An active control mechanism for stabilizing an actuator, comprising:
   a) a driver configured to exert a driving force on the actuator;
   b) at least one sensor attached to the actuator, configured to produce a sensor signal;
   c) a controller coupled to the driver configured to generate a drive signal corresponding to the driving force; and
   d) a phase shifter configured to shift a phase of the drive signal relative to the sensor signal.

2. The active control mechanism of claim 1, wherein the phase shifter shifts the phase by a phase lag of between 90° and 270°.

3. The active control mechanism of claim 2, wherein the phase shifter shifts the phase of the drive signal, by an amount that depends in a frequency of the drive signal.

4. The active control mechanism of claim 1, wherein the phase shifter includes a low pass filter.

5. The active control mechanism of claim 4, wherein the low pass filter has a cutoff frequency that is lower than a vibrational mode of the actuator.

6. The active control mechanism of claim 4, wherein low pass filter is configured to reduce a phase lag of a butterfly mode of the actuator and increase a phase lag of an out of phase mode of the actuator.

7. The active control mechanism of claim 1, wherein the phase shifter includes a notch filter.

8. The active control mechanism of claim 1, wherein the at least one sensor is a strain sensor and the phase shifter shifts the phase by a phase lead of between 90° and 180°.

9. The active control mechanism of claim 1, wherein the at least one sensor is a strain rate sensor and the phase shifter shifts the phase by a phase lag of between 0 and 90°.

10. The active control mechanism of claim 1, wherein the at least one sensor is a rate of strain rate sensor and the phase shifter shifts the phase by a phase lag of between 90° and 180°.

11. The active control mechanism of claim 1, wherein the actuator comprises an arm assembly having a coil support and a coil mounted to the coil support, wherein the at least one sensor is mounted to the coil support to register deformations of the coil support.

12. The active control mechanism of claim 1, wherein the at least one sensor is selected from the group consisting of strain sensors, strain rate sensors, and rate of strain rate sensors.

13. An active control mechanism for stabilizing an actuator system having an arm assembly, an actuator for moving said controlled element by moving said arm assembly, said arm assembly experiencing vibrational modes, said active control mechanism comprising:
   a) a sensing means attached to said actuator for generating one or more sensor signals correlated to said vibrational modes;
   b) a control means connected to said sensing means for deriving from said signals an adjustment signal including a phase shift; and
   c) a combining element connected to said control means, to said controlled element and to said actuator for combining said adjustment signal and said one or more sensor signals to produce a feedback signal for driving said actuator.

14. The active control mechanism of claim 13, wherein the phase correction includes a phase lag of between 90° and 270°.

15. The active control mechanism of claim 13, wherein the sensing means comprises at least one sensor selected from the group consisting of strain sensors, strain rate sensors and rate of strain rate sensors.

16. The active control mechanism of claim 13, wherein said actuator comprises a coil and said sensing means detect deformations of said coil produced by said vibrational modes.

17. The mechanism of claim 13 wherein the phase shift implements a correction chosen from the group consisting of an inertia correction, a stiffening correction and an active damping correction.

18. A method for actively stabilizing an actuator system having an arm assembly, an actuator for moving said controlled element by moving said arm assembly, said arm assembly experiencing vibrational modes, said method comprising the following steps:
   a) generating at least one sensor signal correlated to said vibrational modes;
   b) deriving from said at least one sensor signal a adjustment signal including a phase shift with respect to said at least one sensor signals;
   c) combining said adjustment signal and said at least one sensor signal to produce a feedback signal; and
   d) driving said actuator with said feedback signal.

19. The method of claim 18, wherein the phase shift implements a correction chosen from the group consisting of an inertia correction, a stiffening correction and an active damping correction.

20. The method of claim 19, wherein said phase correction includes a phase lag.

21. The method of claim 20, wherein said phase lag is between 90° and 270°.

22. The method of claim 18, wherein said phase correction is proportional to a frequency of said position signal.

23. The method of claim 18, wherein said phase correction stabilizes one or more of said vibrational modes.

24. The method of claim 18, wherein the at least one sensor signal is a strain signal and the phase shift is a phase lead of between 90° and 180°.

25. The method of claim 18, wherein the at least one sensor signal is a strain rate signal and the phase shift is a phase lag of between 0 and 90°.

26. The method of claim 18, wherein the at least one sensor signal is a rate of strain rate signal and the phase shift is a phase lag of between 90° and 180°.

* * * * *